(12) United States Patent
Brandt

(10) Patent No.: US 7,634,257 B2
(45) Date of Patent: Dec. 15, 2009

(54) METHOD AND ARRANGEMENT FOR POSITIONING A MOBILE TERMINAL

(75) Inventor: Jan Brandt, Turku (FI)

(73) Assignee: Nokia Corporation, Espoo (FI)

( * ) Notice: Subject to any disclaimer, the term of this patent is extended or adjusted under 35 U.S.C. 154(b) by 682 days.

(21) Appl. No.: 10/533,155

(22) PCT Filed: May 26, 2003

(86) PCT No.: PCT/FI03/00402

§ 371 (c)(1),
(2), (4) Date: Oct. 14, 2005

(87) PCT Pub. No.: WO03/103316

PCT Pub. Date: Dec. 11, 2003

(65) Prior Publication Data

US 2006/0105755 A1    May 18, 2006

(30) Foreign Application Priority Data

May 31, 2002    (FI)    ................................ 20021032

(51) Int. Cl.
*G06F 15/00* (2006.01)
(52) U.S. Cl. ..................... 455/418; 455/41.2
(58) Field of Classification Search ................ 455/414, 455/456.1, 456.6, 450, 418, 41.2
See application file for complete search history.

(56) References Cited

U.S. PATENT DOCUMENTS

| | | |
|---|---|---|
| 5,673,023 A | 9/1997 | Smith |
| 5,796,338 A | 8/1998 | Mardirossian |
| 6,397,088 B1 | 5/2002 | Roo |
| 6,493,550 B1 | 12/2002 | Raith |
| 2002/0198006 A1 * | 12/2002 | Hirayama et al. ........... 455/456 |
| 2003/0073432 A1 * | 4/2003 | Meade, II ................... 455/420 |

FOREIGN PATENT DOCUMENTS

| | | |
|---|---|---|
| EP | 1 035 743 | 3/2000 |
| EP | 1251472 A1 | 10/2002 |
| JP | 9-312890 | 12/1997 |
| JP | 2000-261870 | 9/2000 |
| WO | WO 0032002 A1 | 6/2000 |

OTHER PUBLICATIONS

Japanese Office Action (Translation) issued in Japanese Application No. 2004-210265 dated Aug. 3, 2007.
Patent Abstracts of Japan, Publication No. 09-312890, Location Response Remote Control Device, published Dec. 2, 1997, plus machine translation of original Japanese document.
Patent Abstracts of Japan, Publication No. 2000-261870, Communication Apparatus Position Detecting System and Recording Medium for Recording Communication Apparatus Position Detecting Program, published Sep. 22, 2000.

* cited by examiner

*Primary Examiner*—Sam Bhattacharya

(57) ABSTRACT

A method and arrangement are shown for positioning a mobile terminal, particularly within a finite local area. In the method, in the transmitting mobile terminal, there is defined a function that is observable by senses and executable, and a functional instruction is created for activating said function. The functional instruction, the function according to which is arranged to be activated as a response to receiving the functional instruction, is transmitted via the established wireless short-range connection. In the receiving mobile terminal, the functional instruction is received via the wireless short-range connection, and the function defined in the functional instruction is activated as a response to receiving the functional instruction.

30 Claims, 2 Drawing Sheets

METHOD AND ARRANGEMENT FOR POSITIONING A MOBILE TERMINAL

CROSS-REFERENCE TO RELATED APPLICATION

Figure 1:
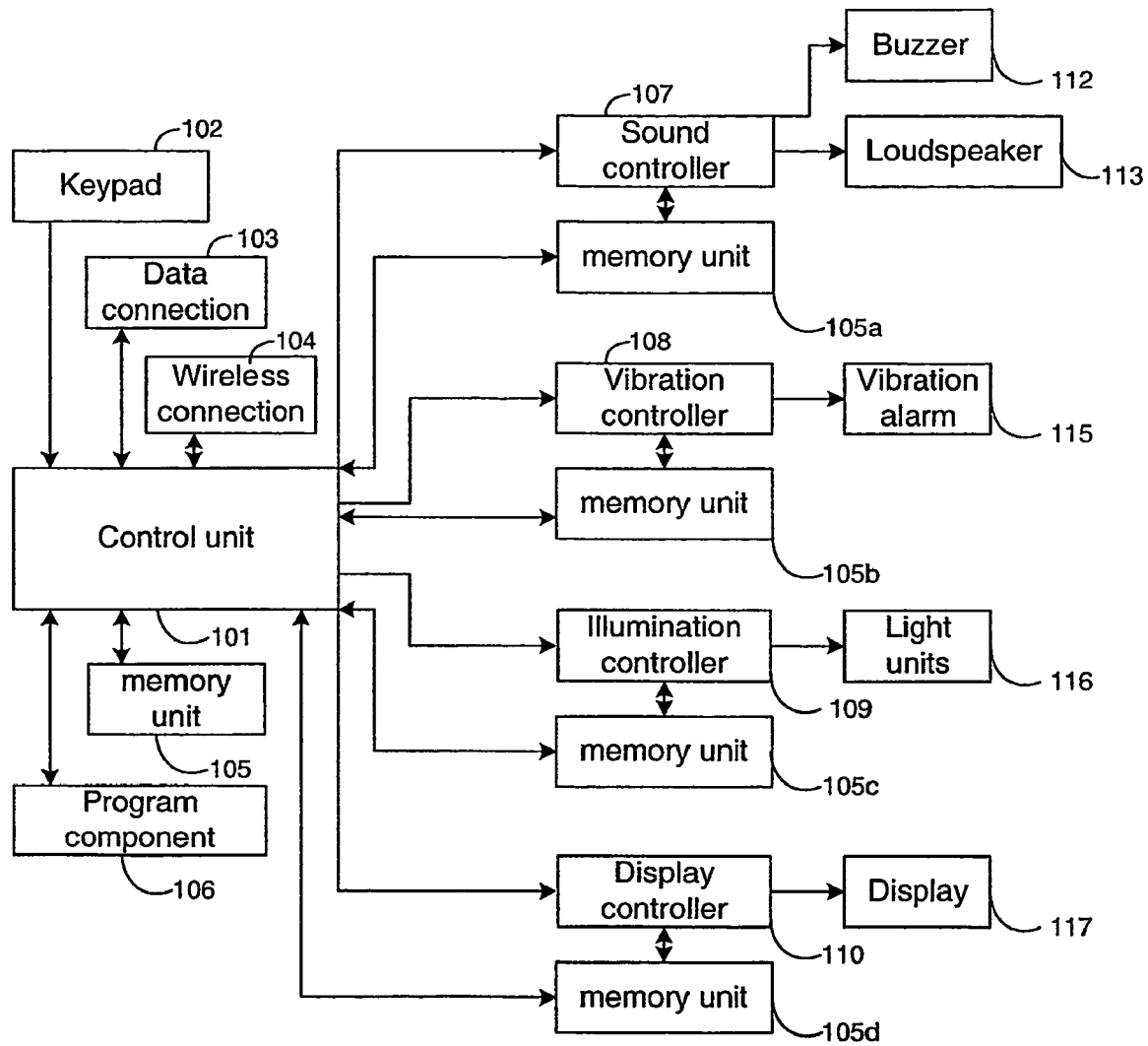

This is the U.S. National Stage of International Application Number PCT/FI03/00402 filed May 26, 2003 and published in English on Dec. 11, 2003 under International Publication Number WO 03/103316 A1.

The invention relates to the positioning of mobile terminals particularly within a finite local area.

In a home register or a visitor register there typically is knowledge of under which base station the mobile devices within the coverage area are located. The position of the mobile terminal can be determined by the network or by the mobile terminal and network together. The position of mobile devices is thus known at least with base station specificity. More accurately, mobile devices can be positioned for example by means of the GPS (Global Positioning System) or by means of other known positioning systems. Typically in a mobile device, there can be loaded a desired map base, in which more data is filled in on the basis of inquiries, said data being position coordinates, route and distance information, trip and distance measurement findings and similar information.

A more general positioning problem among users is, however, how to locate a mobile device and possibly its user within a given finite area. In many situations it is known that a mobile device is located within a given finite area, but the accurate location is not detected. For instance, it may be known that a device is within a given building, within a given space or otherwise within known boundaries. However, the accurate position of the device is not known. The fact that the position of the device is not detected may be due to a lack of observation on the side of the user, or to circumstances, for instance a noisy, dark, crowded or smoky environment.

Typically when a mobile terminal alarms, it repeats a chosen tone, the lights flash on and a text and/or image is formed on the display. When a mobile terminal alerts, both the hearing and eyesight are stimulated. In situations where this is not enough, a vibration effect can be added in the mobile terminal. The touch stimulus caused by the vibration effect is perceived for instance in a noisy or dark environment, when the auditory and visual stimuli are not sufficient in order to attract user's attention. These features are defined by the user himself, and another person looking for the mobile terminal or its user cannot know how the mobile terminal alarms. In addition, these features are adjustable, and typically only the user himself knows and identifies the functions that the device performs as a response to a request for connection.

In order to establish a connection, or only to transmit the request for connection from one device to another, both devices must be within the coverage area of the network. If the device is not capable of establishing a network connection, it is neither capable of establishing a connection with another device. This is often the problem for instance in certain areas or in a certain space, where audibility is weak or non-existent.

The object of the invention is to activate a mobile device so that it can be perceived by the human senses and thus located.

The object is achieved so that a functional instruction to be executed is transmitted to the mobile device via a wireless short-range connection. In addition, the object is achieved so that the functions contained in the instruction are executed as a response to their reception.

The invention is characterized by what is set forth in the characterizing parts of the independent claims. Preferred embodiments of the invention are described in the dependent claims.

According to a preferred embodiment of the invention, a mobile device can be located for example visually by activating by remote control some defined functions that can be perceived by the human senses. The activation is carried out via a given short-range connection, and a network connection is not required. A short-range connection is extensive enough, because the purpose is to perceive the device and its location by the human senses on the basis of sensual stimuli produced by the device. A wider functional coverage is not needed, because at a longer distance the device cannot, on the basis of its functions, in any case be perceived by the human senses.

According to the invention, the device and its bearer can thus be located also in circumstances where they are outside the network coverage area, or when a connection to the network cannot for some reason be established. For instance in service and rescue operations, devices must often be used outside the coverage area. In a small area, for example in the cellar of a building or in poorly illuminated conditions, it is often useful to rapidly locate another device and its bearer. When operating in a finite area, a directly and sensually perceivable indication of the location of another device is more essential than the exact location with the position coordinates of the device.

According to a preferred embodiment of the invention, the positioning of another device is realized so that a first device is used for defining for example sound and flashing light functions, and these functions are combined into given functional instructions that are transmitted to a second receiving device via an established short-range connection. The second device receives the functional instructions. The receiving device executes the functions according to the instructions, which functions typically make the device easier to perceive by the human senses.

Figure 2A:
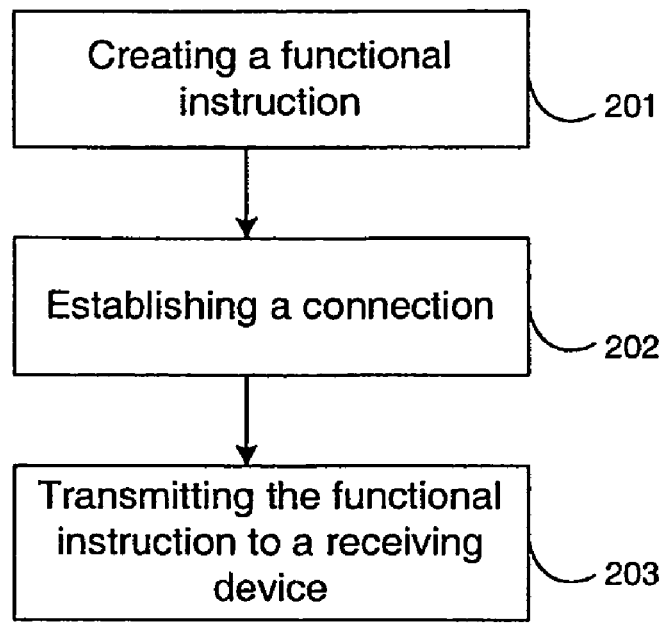
Figure 2B:
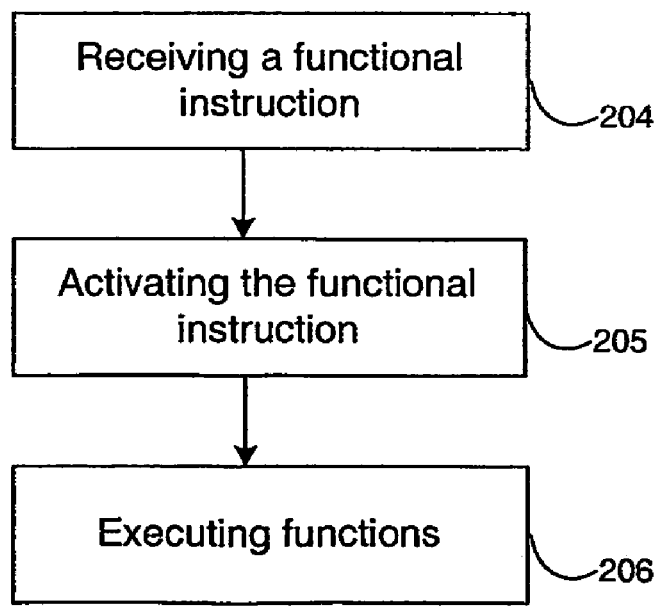

In the following the invention is described in more detail with the accompanied figures, where FIG. 1 is a block diagram of a device according to a preferred embodiment of the invention, FIG. 2a is a flow diagram of a method according to a preferred embodiment of the invention at a transmitting device, and FIG. 2b is a flow diagram of a method according to a preferred embodiment of the invention at a receiving device.

FIG. 1 illustrates a device according to a preferred embodiment of the invention. A central part of the device is the control unit 101 that takes care of the operation and functional control of the device. The control unit 101 includes a microprocessor for controlling and monitoring the functions. The control unit 101 is linked to all other components of the device, either directly or through their control units.

Data may be fed to the device through the keypad 102. In addition, functions can be controlled or added via the data connection 103. According to a preferred embodiment of the invention, the device also includes separate means for a wireless connection 104. In order to establish for instance a short-range connection, the element 104 can be a chip that processes radio waves, or a panel that transmits infrared radiation.

The device comprises a memory unit 105 as well as controller specific memory units 105a, 105b, 105c, 105d. The term memory unit 105, 105a, 105b, 105c, 105d generally refers to all such elements in the device in which data can be stored and from which said data is later obtained for the use of the device and its components. Memory units include both elements for recording sound, text, light and other functions of the device, and a separate, replaceable memory card, where for instance name and number data can be recorded.

The device is provided with a given program component 106 for defining and executing component functions. The program component 106 contains and processes functional instructions according to which the control unit 101 controls single components directly or through their control units.

The sound controller 107 of the arrangement copes with processing of various sounds. The sound controller 107 can look up or record sounds or various musical tones for example from a separate memory unit 105*a* containing different sounds and tones. The sound controller 107 transmits the sounds to be reproduced for instance to a sound unit 112, a loudspeaker 113 or a similar sound-producing device.

The vibration controller 108 of the device can receive data from the control unit 101 or from a separate memory unit 105*b* containing various vibration effects. The vibration controller 108 transmits the received data to be realized in the vibrator alarm 115.

The illumination controller 109 can receive data from the control unit 101, or from a separate memory unit 105*c* containing light effects. The illumination controller 109 sends functional instructions further for instance to light units 116 illuminating the user interface of a mobile terminal. Typically the light units 116 are LED lights. Part of the light units can be background lights for the display.

The display controller 110 can receive data from the control unit 101 or from a separate memory unit 105*d* containing graphic objects or text. The display controller 110 brings the data further to be shown on the display 117. The display controller 110 may modify graphic objects contained in the memory unit. In addition to modification, the display controller 110 can combine objects and for example represent several pictures sequentially in order to create a small-scale animation.

In addition, the device illustrated in FIG. 1, typically a mobile terminal, comprises typical transmission and reception branches for establishing a network connection and for transmitting data into the network and for receiving data from the network. These transmitter and receiver branches are not illustrated in FIG. 1.

According to a preferred embodiment of the invention, the programming component 106 is used for creating a function or a combination of functions that can be perceived by the human senses, which function or combination of functions can be transmitted via a wireless connection 104 to the program component of the receiving device. When the program component 106 receives the functions transmitted via the wireless connection 104, said functions are activated, so that the instructions and commands according to the functions are transmitted to the control unit 101 that guides single components according to the functional instructions. The functions advised in the functional instructions are executed by the components of the device.

According to one embodiment of the invention, to the receiving device there is transmitted only an activation command that is directed to certain default functions. Consequently, in the receiving device there are defined and recorded certain default functions that are executed when the device receives a command to activate. The user can modify the default functions of the device in a similar way as other functions of the device, for instance ringing tones. Typically there are several different default functions, and new default functions can be added within the scope of the special features of the device in question.

When another device located nearby area should be positioned, there is defined a desired function that is suitable in the situation; a functional instruction is composed, and it is transmitted to the device to be positioned. When the device to be positioned executes the defined functions, the device is easy to detect. Thus the defined functions are functions that can be perceived by the human senses. One of the functions can be for example a ringing tone or another sound pattern that can be reproduced. The sounds can be for example peeping sounds, melodies or simple musical tones. Some devices are provided with a MIDI (Musical Instrument Digital Interface), whereby sound patterns can be composed and reproduced. Typically sound patterns are reproduced by means of a buzzer or a loudspeaker provided in the device.

Together with sounds, or instead of sounds, there can also be used vibration. In that case the vibration unit of the device is controlled in order to create a vibrating motion. The vibrating motion can be perceived by the sense of touch, when the person is in immediate or nearly immediate contact with the device. A vibrating device is discerned from even a longer distance for instance when the vibration unit of the device is placed against a rigid, non-flexible surface. Typically the vibration of the vibration unit against a solid surface creates a resonance noise, and because said surface is not flexible, a fairly light device usually moves on the beat of the vibration.

In addition to sound or instead of sound, it is often practical to use a clear visual effect. A typical visual effect is a text, graphic illustration or a small-scale animation presented on the display of the device. The data displayed on the screen does not help in perceiving the device from further away, but if one device should be individualized among several devices located at the near distance, it can be done by means of a textual and/or graphic identifier displayed on the screen. In addition, the illustration shown on the screen can serve as an informative message to the user whose device receives the functional instruction to be executed.

Apart from text or graphics represented on the display screen, the visual function can also be a light effect realized by means of the light units of the device. The illumination of the display and keypad of the device can be realized for instance by means of electro luminescence. In general, the device is illuminated by several light units that are typically LED (Light Emitting Diode) components. For example in a mobile terminal, the light units are placed on a circuit board, where they are often arranged at the edges of the display and the keypad, or between the keys. They are installed so that the light from the light units is distributed, via light conductors included in the arrangement, in the desired area, and that the display and the keypad are illuminated. The power fed into the light units, i.e. the lighting up and fading out of the lights can be controlled. This kind of fluctuation in the illumination is called a flash pattern. Various flash patterns can be created by adjusting the power fed into the light units, so that there are achieved differences in brightness. The light units can also be arranged in groups that are illuminated in turn or in a given order. Single light units can also be controlled, as well as the power supply therein. In addition, colors can be used in single light units. The significance of the power of attraction of the flash patterns is emphasized in twilight or in darkness.

According to a preferred embodiment of the invention, the desired function or a combination of functions can be selected for instance in the control menu of the device. From the control menu, there can be chosen a given flash pattern, vibration, tone, graphic figure or other feature. According to another embodiment, the mobile communications device is provided with pre-installed modes for the functions to be combined. In that case, functions can be defined according to each predetermined setting. According to a preferred embodiment, the functions can be edited and modified into desired variations. In order to execute the selected functions, there is formed a functional instruction that can be recorded in the memory of the device also for further usage. According to a preferred embodiment, the functional instruction is an activation command that activates the default functions, defined in the receiving device, to be executed. The formed or recorded functional instruction can be transmitted to another device for example via a established radio link or via some other short-range connection.

The functional instruction to be transmitted contains an activation command, or the activation command is transmitted along with it. According to the preferred embodiment, the function according to the functional instruction is activated immediately when the functional instruction is received. The receiving device typically contains a menu where the execution of the functional instructions can be permitted or rejected. The user has a possibility to prohibit that the functions of his device are activated and executed from another device. According to a preferred embodiment, it can also be defined that given functions, for instance a tone pattern, is not executed according to the functional instruction, although the execution of other functions is permitted. If the device receives a functional instruction that cannot be executed, for instance because a given function is unknown to the receiving device, it is possible to execute a corresponding predetermined default function. Advantageously the receiving device also defines a given duration or number of repetitions for the functions in order to prevent the functions from consuming so much power that the other functions of the device are affected.

Let us observe a method according to a preferred embodiment of the invention as realized in the transmitting device, with reference to FIG. 2a. First the device creates a functional instruction at step 201. On the basis of the functional instruction, there is defined which functions are activated in the receiver's device. The functional instruction can define a single function, for instance the reproduction of a certain sound effect, or a combination of functions, such as a sound effect and the flashing of lights. The functional instruction can be looked up in the memory, where it was stored in advance. The functional instruction can also be an activation command directed to the default functions of the receiving device.

In step 202, there is established a connection to the device to which the created functional instructions should be transmitted. Typically the connection is a wireless short-range radio connection. A known wireless short-range connection between devices is a bluetooth. The bluetooth technique is based on a radio link operating within the frequency range of 2.4 gigahertz. For establishing a short-range connection, for instance infrared technique has earlier been applied, but with infrared, an essentially more precise alignment is required between the connection panels, and an infrared connection is much more susceptible to interference than the bluetooth. The bluetooth can be realized by means of advantageous radio technique that is fitted in a small space and consumes a limited amount of energy only.

The establishment of a bluetooth connection requires that the devices making the connection include a transceiver chip. Each device has a specific address, and the connection established therebetween can be either of the point-to-point type or of the point-to-multipoint type. Thus a connection can be established for several receivers simultaneously. The maximum range of a bluetooth connection is ten meters. Short-range connections can be used between various devices, such as mobile terminals, computers and PDA:s (personal digital assistant). In principle, the bluetooth system is packet-switched, but also circuit-switched connections can be established. Normally, when connections do not exist between the devices, they are in a so-called standby mode.

When a device in this embodiment in step 202 wishes to establish a connection with another device or with other devices, the device making connection can establish the connection directly to the identified device address, or it can start an inquiry of the devices that are located within the coverage area. With all or some of the devices detected on the basis of the inquiry, a bluetooth connection can then be established. According to the preferred embodiment, there are recorded the addresses of certain devices in the memory of the device. These can be stored for example in connection with the corresponding name and number information. Thus the device address to the target with which the connection is being established can be looked up in the memory as a shortcut search. Along the established connection, a functional instruction is transmitted to one or several receiving devices in step 203.

According to a preferred embodiment, a device to which a functional instruction is transmitted, is listed in the memory of the transmitting device. Thus the device has in its memory a list of devices to which functional instructions are transmitted. The list can also be completed with information of the time of the transmission, of the transmitted functional instructions, of the total duration of the connection, and so on. If only a list of the devices located nearby should be made, the list according to this embodiment can be composed by transmitting an empty functional instruction or a functional instruction in order to execute a silent function. In that case the transmitting device does not execute anything, it is only listed in the memory of the transmitting device.

FIG. 2b illustrates a method according to a preferred embodiment of the invention with respect to the receiving device. First some other device establishes a connection with the receiving device. In step 204, the functional instruction transmitted via the connection is received. Thereafter the operations according to the functional instruction are activated in the device in step 205. Activation here means that the operations according to the functional instructions are initiated and prepared so that the corresponding execute commands can, after activation, be transmitted to the component—or its control component—that performs the function. In the activation step, there is for instance looked up functions according to the functional instructions in the memory, compiled functions by forming a new function defined in the functional instructions by means of known functions, or transmitted a given code-language functional instruction to a given control component for a future execution.

Thereafter it is checked, in step 205, whether the functions according to the functional instruction can be executed in the receiving device. First it is checked whether it is permitted in the current device settings to execute the functions according to the functional instructions received from another device. There may be a general prohibition, in which case the functional instruction cannot be activated at all. The functional prohibition may also refer only to a certain function, for instance vibration. If the functions according to the functional instructions are not permitted, the user can be informed, for example by a text shown on the display screen, that a device has transmitted functional instructions to his device. After that, the user may either activate the received functional instructions, store them or remove them.

According to a preferred embodiment, in step 205 the commands and instructions of the functional instruction are processed one by one. In case a given command cannot be executed in the receiving device, it is possible to move over to the next command of the functional instruction, or to execute a default function of the receiving device. For instance the vibration function cannot be executed, if the receiving device does not have a vibration unit; in order to execute a sound pattern, the functional instruction may include a simple activation command, in which case the sound pattern to be executed is looked up in the memory. If the sound pattern is not found in the memory, the function cannot be executed. Along with an activation command, it is also possible to transmit a more detailed functional instruction, for example in order to form a given sound or flash pattern.

If the execution of functional instructions is permitted, the activated functional instructions are executed in step 206. According to a preferred embodiment, the functional instructions or the settings of the receiving device define how long or how many times the function in question is executed. This moderates the power consumption, because for instance vibration consumes quite a lot power even in a short time. The functions according to the functional instructions received in step 206 are executed for a given predetermined number or duration. The executed functional instruction can be stored in the device memory for further usage.

The activation of another device according to a preferred embodiment of the invention is realized in real-time, for instance via a radio link, even if a network connection could not be established. For instance in basement or cellar floors or outside the coverage area, a network connection cannot be established. This feature is useful for example for policemen or firemen who may be present in the same building without noticing each other owing to smoke or noise. In addition, the activation of given functions in another device according to the invention is useful, because then it is possible to emphasize the function that is best distinguished in the conditions at hand, or is clearest for the user to observe, so that the device is easily detected. In smoky or dark surroundings, the defined function can be at least a clearly visible flash pattern. In bright light, a better-distinguished feature is sound. As for a noisy environment, flash patterns are distinguished best. In general, it is advantageous to combine functions and produce several stimuli to the senses simultaneously.

According to one embodiment of the invention, a mobile terminal transmits functional instructions automatically. The functional instructions can be transmitted periodically e.g. by certain time periods, such as once a minute or every five minutes. The functional instructions may be transmitted to a specified mobile terminal or multicasted to a group of mobile terminals. This makes it possible for the user of the mobile terminal to set his/her device to make automatic queries for certain specified mobile terminals in the vicinity. The automatic queries are useful for example in finding someone at happenings that attract significant amounts of people such as concerts, festivals or other crowded occasions. Also a receiving mobile terminal can be set to automatically transmit a response message to a received functional instruction. The receiving mobile terminal advantageously replies to the received functional instruction by transmitting a response message as a response to the received functional instruction. A response message may be a functional instruction or some other type of a message. The responses are typically transmitted via short-range link such as a bluetooth or infrared link. The responses may be transmitted via a long-range link, such as GSM or UMTS as well, for example if the short-range link can no longer be established due to a change in a distance between the devices. This embodiment allows friends, who accidentally happen to be in the same area, to become aware of each others presence. Advantageously the receiving mobile terminal presents a request to its user for transmitting a response message. On a user interface of a receiving mobile terminal there is requested a confirmation from a user for transmitting a response message. The user may then cancel or confirm the transmitting of a response, thus the user decides whether he/she wants to announce his/her presence.

The invention claimed is:

1. A method, comprising:
defining an executable function that is detectable by senses,
forming a functional instruction corresponding to the defined function for activating the defined function in a mobile terminal,
establishing a wireless short-range connection, and
transmitting via the established wireless short-range connection the formed functional instruction to the mobile terminal,
checking whether the mobile terminal is permitted to execute the defined function, and
as a response to a situation in which the mobile terminal is permitted to execute the defined function, activating the defined function in the mobile terminal.

2. A method according to claim 1, wherein the executable function is defined to be at least one of the following: a flash pattern, a vibrating motion, a sound pattern or a visual effect represented on the display screen.

3. A method according to claim 1, wherein as a response to receiving of an activation command, a predetermined default function is activated.

4. A method according to claim 1, wherein there is defined an activation command in the functional instruction for activating a function and a detailed instruction for executing the function.

5. A method according to claim 1, wherein the function and the respective functional instruction are selectable from a menu displayed by a user interface of the mobile terminal, said menu comprising functions and corresponding functional instructions.

6. A method according to claim 1, wherein the function is defined by selecting a given function executable by the mobile terminal and by composing a functional instruction, on the basis of which the selected function is activated to be executed.

7. A method according to claim 1, wherein the function is defined by composing a functional instruction for activating a function by means of input elements arranged in the mobile terminal.

8. A method according to claim 1, wherein a wireless short-range connection is established with several receiving mobile terminals simultaneously by the mobile terminal establishing the connection.

9. A method according to claim 1, wherein the established wireless short-range connection is a radio link established by a transmitting mobile terminal.

10. A method, comprising:
receiving in a mobile terminal via a wireless short-range connection a functional instruction for activating a function,
checking whether the mobile terminal is permitted to execute the function and
as a response to a situation in which the mobile terminal is permitted to execute the defined function,
activating the function according to the functional instruction in the mobile terminal.

11. A method according to claim 10, wherein the method further comprises
receiving a functional instruction including an activation command for activating a function and including a detailed instruction for executing the function, and
activating the function as a response to receiving the functional instructions.

12. A method according to claim 10, further comprising:
prohibiting the execution of the function according to the functional instruction by recording a prohibition to execute at the mobile terminal, and presenting a notice of receiving the functional instruction as a response to a situation in which the function according to the functional instruction is prohibited to execute.

13. A method according to claim 10, wherein the method further comprises:
receiving an activation command and
activating a predetermined default function as a response to receiving the activation command.

14. An arrangement, comprising:
means for defining an executable function that is detectable by senses,
means for composing a functional instruction corresponding to the defined function for activating the defined function in a mobile terminal,
means for establishing a wireless short-range connection,
means for transmitting the functional instruction via the established wireless short-range connection to the mobile terminal,
means for checking whether the mobile terminal is permitted to execute the defined function, and
means for activating the defined function in the mobile terminal as a response to a situation in which the mobile terminal is permitted to execute the defined function.

15. An arrangement according to claim 14, wherein said arrangement further comprises means for defining any one or more of a flash pattern, a sound pattern, a vibrating motion or a visual effect presented on the display screen.

16. An arrangement according to claim 14, further comprising means for associating an activation command for activating a predetermined default function with the functional instruction.

17. An arrangement according to claim 14, further comprising means for adding a detailed instruction describing the execution of the function to the functional instruction.

18. An arrangement according to claim 14, further comprising a menu containing functions of the mobile terminal and corresponding functional instructions in order to define the function and to form the functional instruction.

19. An arrangement according to claim 14, further comprising means for defining a certain function and means for composing a functional instruction, on the basis of which the defined function is activated.

20. An arrangement according to claim 14, wherein the short-range connection is a radio link realized by bluetooth technique.

21. An arrangement, comprising:
means for receiving in a mobile terminal via a wireless short-range connection a functional instruction for activating a function,
means for checking whether the mobile terminal is permitted to execute the function, and
means for activating the function according to the functional instruction in the mobile terminal as a response to a situation in which the mobile terminal is permitted to execute the function.

22. An arrangement according to claim 21, further comprising means for receiving a functional instruction including an activation command for activating a function and a detailed instruction for the function, and means for activating the function according to the detailed instruction, as a response to receiving the functional instruction.

23. An arrangement according to claim 21, further comprising means for rejecting the function according to the functional instruction and means for indicating the reception of the functional instruction as a response to receiving a functional instruction that is forbidden to execute.

24. An arrangement according to claim 21, further comprising means for receiving an activation command for activating a function, and means for activating a predetermined default function as a response to receiving the activation command.

25. An arrangement comprising a control unit that is configured:
to define an executable function that is detectable by senses,
to compose a functional instruction corresponding to the defined function for activating the defined function in a mobile terminal,
to establish a wireless short-range connection, and
to transmit the functional instruction via the established wireless short-range connection to the mobile terminal,
wherein the arrangement further comprises a circuitry that is configured to check whether the mobile terminal is permitted to execute the defined function and the mobile terminal is configured to activate the defined function as a response to a situation in which the mobile terminal is permitted to execute the defined function.

26. An arrangement comprising:
a mobile terminal that includes a receiver for receiving via a wireless short-range connection a functional instruction for activating a function, and
a circuitry arranged to check whether the mobile terminal is permitted to execute the function and to activate the function according to the functional instruction in the mobile terminal as a response to a situation in which the mobile terminal is permitted to execute the function.

27. A mobile terminal comprising:
a receiver for receiving via a wireless short-distance connection a functional instruction for activating a function, and
a circuitry arranged to check whether the mobile terminal is permitted to execute the function and to activate the function according to the functional instruction as a response to a situation in which the mobile terminal is permitted to execute the function.

28. The method of claim 10, wherein said function is to allow finding a user of said mobile terminal in a crowded situation by receiving a query sent by another terminal and wherein said checking comprises said mobile terminal presenting said user of said mobile terminal with a request for confirmation that said mobile terminal is permitted to execute said function by transmitting a response to said query.

29. The mobile terminal of claim 27, wherein said function is to allow finding a user of said mobile terminal in a crowded situation by receiving a query and sent by another terminal and wherein said circuitry to check whether the mobile terminal is permitted to execute said function is to present said user of said mobile terminal with a request for confirmation that said mobile terminal is permitted to execute said function by transmitting a response to said query.

30. A computer readable medium comprising computer executable instructions for making a programmable processor of a mobile terminal:
- to receive via a wireless short-distance connection a functional instruction for activating a function,
- to check whether the mobile terminal is permitted to execute the function, and
- to activate the function according to the functional instruction as a response to a situation in which the mobile terminal is permitted to execute the function.

* * * * *